Oct. 30, 1923.
J. W. CROWDER
LAWN TRIMMER
Filed March 31, 1921
1,472,587
2 Sheets—Sheet 1
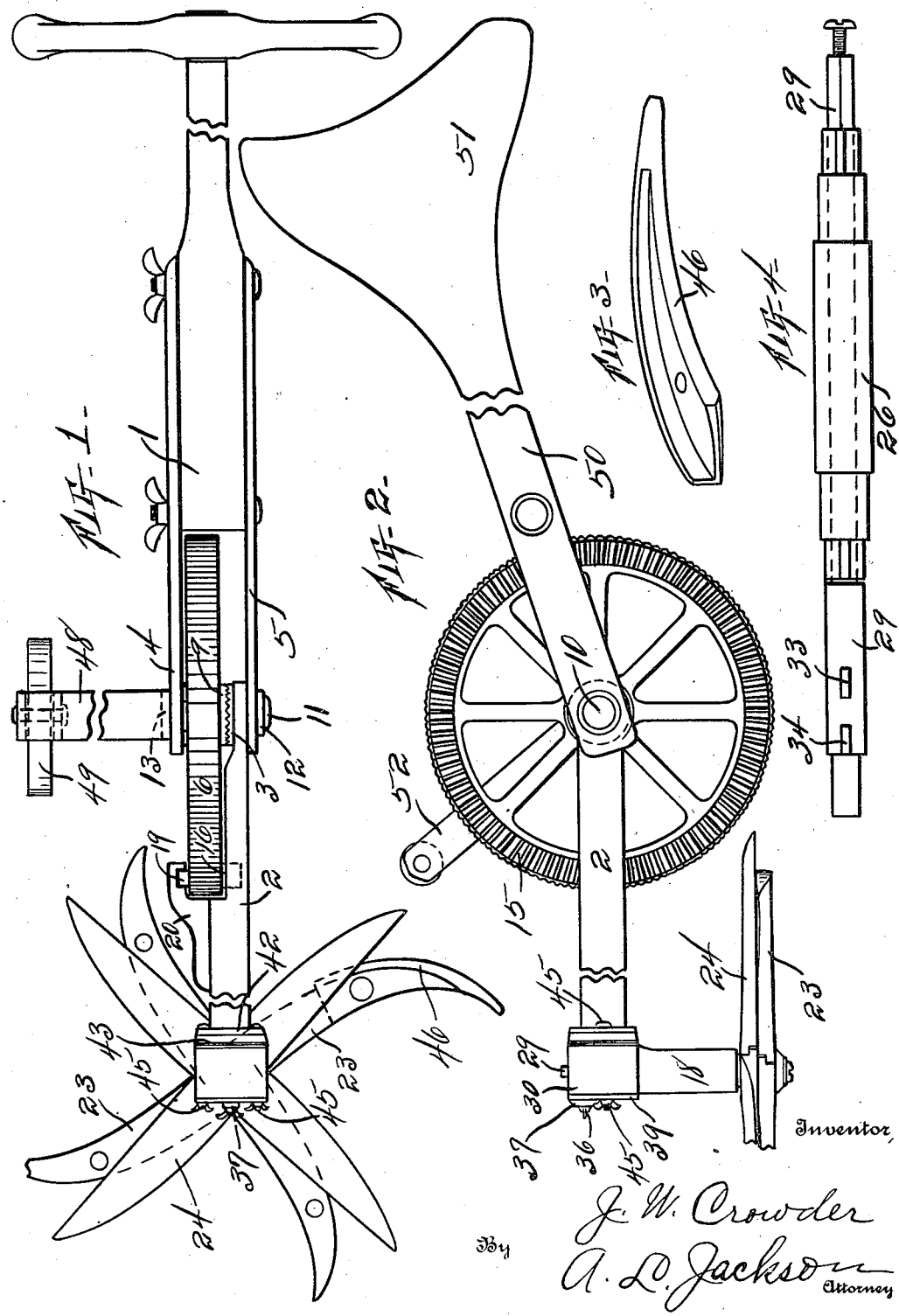
Inventor
J. W. Crowder
A. L. Jackson
Attorney

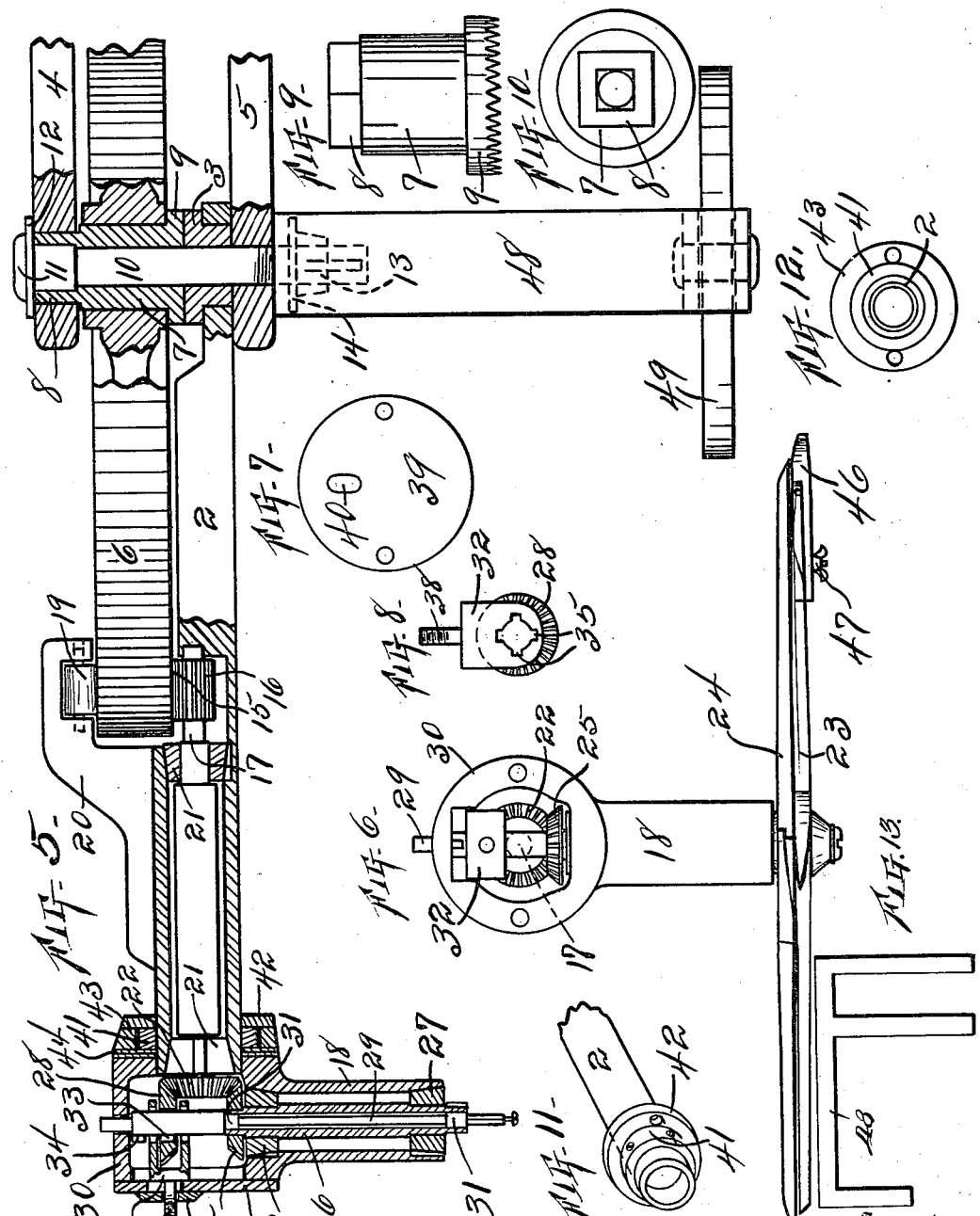

Patented Oct. 30, 1923.

1,472,587

UNITED STATES PATENT OFFICE.

JOSEPH WADE CROWDER, OF SEMINARY HILL, TEXAS.

LAWN TRIMMER.

Application filed March 31, 1921. Serial No. 457,331.

*To all whom it may concern:*

Be it known that I, JOSEPH W. CROWDER, a citizen of the United States of America, residing at Seminary Hill, county of Tarrant, and State of Texas, have invented certain new and useful Improvements in Lawn Trimmers, of which the following is a specification.

My invention relates to improvements in lawn trimmers and more particularly to rotary cutting blades which may be driven horizontally or vertically; and the object is to provide a simple lawn trimmer which is relatively light and easily operated and which is provided with cutting blades which may be set for cutting horizontally for trimming lawns and for cutting close up to walls and under fences and shrubbery and also set for cutting vertically for trimming along side walks or drives and which is provided with cutting blades to be driven in opposite directions when so required, and to provide means for easily and quickly setting the blades in different positions. Another object is to provide means for locking one set of blades stationary while one set of blades rotates or revolves. Another object is to provide the trimmer with mounting and adjusting devices which will not be displaced when they are in use and which are provided with bearings which are held in place by their location in the frame members and need no bolts or nuts for holding the same in place. Other objects and advantages will be fully explained in the following description and the invention will be more particularly pointed out in the claims.

Reference is had to the accompanying drawings which form a part of this application.

Fig. 1 is a plan view of the trimmer with the blades set for horizontal cutting. Fig. 2 is a side elevation of the trimmer adapted for use in trimming hedges without the use of the traction wheel, as such, the wheel 6 being used in this instance as a driving wheel. Fig. 3 is a perspective view of a grass lifting attachment to be attached to blades which are made stationary when the blades are positioned for vertical cutting. Fig. 4 is a side view of the driving shaft. Fig. 5 is a broken horizontal section of parts of the trimmer, illustrating the construction of various parts of the trimmer, the blade carrier being positioned for vertical cutting. Fig. 6 is a front elevation of the blade carrier, the cap being removed from the gear casing. Fig. 7 is a face view of the cap removed from the device shown in Fig. 6. Fig. 8 is a side elevation of a gear carrying yoke. Fig. 9 is a detail view of the shaft or journal member 7. Fig. 10 is an end elevation of the same. Fig. 11 is a perspective view, illustrating the swivel connection of the bearing member. Fig. 12 is an end view of the same. Fig. 13 is a detailed view of the brace arm 48.

Similar characters of reference are used to indicate the same parts throughout the several views.

The trimmer is provided with a simple frame, consisting of a handle 1 and a bearing member 2. Means are provided for making the handle 1 and the bearing member 2 rigid with each other and for setting the handle at any angle to the bearing required. A circular rack member 3 is rigid with the bearing member 2. The handle 1 is provided with strap bars 4 and 5 which are bolted thereto and to be connected to the bearing member 2. A traction and supporting wheel 6 is provided and a journal member or shaft 7 is provided for the wheel 6. The wheel 6 turns freely on the shaft 7. The strap bar 4 has a square opening therein to receive a square portion 8 of the shaft 7. This will make the shaft 7 rigid with the handle. The shaft or journal 7 has a circular rack 9 which is adapted to mesh with the circular rack 3. The circular racks 3 and 9 are bound together by a bolt 10. The bolt 10 has a head 11 and a washer 12 on one end and a nut 13 and a washer 14 on the other end. When the nut 13 is tightened on the bolt 10, the racks 3 and 9 are clamped rigid with each other. The wheel 6 will then turn freely on the shaft or journal 7. The wheel 6 has face cogs 15 which mesh with the pinion 16 which is rigid with a shaft 17. As the trimmer is moved or pushed along on the ground, the wheel 6 will drive the shaft 17 by means of the gearing 15 and 16. The nut 13 may be loosened and the racks 3 and 9 adjusted on each other to set the handle 1 at any angle to the bearing member 2 that may be required.

A blade carrier 18 is adjustably connected to the bearing member 2. An antifriction roller 19 is carried in an arm 20 which may be made integral with bearing member 2.

The roller 19 will hold the pinion 16 in mesh with the face cogs 15 of wheel 6 so that the drive will be positive.

The shaft 17 is journaled in bearings 21 which are stationary in the bearing member 2 and it is apparent that these bearings may be conical or cylindrical or roller bearings. A bevel gear wheel 22 is rigid with shaft 17 and driven thereby.

Provision is made for driving two sets of blades, a lower set 23, and an upper set 24. Upper set 24 is driven whenever any trimming is to be done. A bevel gear wheel 25 is rigid with a sleeve shaft 26 which is mounted in the carrier 18 and provided with bearings 27 mounted in the carrier 18. The blades 24 are made rigid with the sleeve shaft 26. Another bevel gear wheel 28 is provided for driving the lower blades 23. The gear wheel 28 is movably mounted on a shaft 29 which is journaled in the head 30 and in the sleeve shaft 26 by bearings 31. Fig. 5 shows the wheel 28 in driving position. The blades 23 and 24 will be driven in opposite directions and the blades will act as shears for cutting purposes. Provision is made for moving the gear wheel out of operative position and locking the same out of driving position. The shaft 29 runs through the arms of a yoke 32 and the wheel 28 is mounted on the shaft between the arms of the yoke. The shaft 29 is provided with a key 33 for locking the wheel 28 to the shaft for operation and provided with a key 34 for holding the wheel when the shaft 29 is not to be driven. When the shaft 29 is not to be driven, the yoke 32 is used to shift the wheel 28 out of mesh with the wheel 22 and for locking the wheel out of operative position. The yoke 32 is provided with a plurality of seats or slots 35 for convenience in shifting the wheel 28. The keys 33 and 34 might be opposite any one of the slots 35. The wheel 28 is locked out of operative position by a nut 36 and a washer 37, the nut 36 being screwed on the shank 38 of the yoke 32. The head 30 is provided with a cap 39 for inclosing the gearing therein. This cap 39 has an elongated opening 40 so that the shank 38 may be shifted from place to place.

Provision is made for placing the blade holder 18 vertically downward or vertically upward or horizontally on either side or at any angle. A collar 41 is made rigid with bearing cylinder 2 by screws or other means. A swivel collar 42 is first loosely mounted on the bearing member 2 and then collar 41 attached to the bearing member 2. A spacing ring and brace 43 is mounted on the collar 41. This ring 43 will extend the bearing surface of the ring 41 and fill in the space between the ring 42 and adjusting washers 44 which are placed between the head 30 and the ring 43. Bolts 45 are used to bind the head 30 and cap 39 against the rings 41 and 43. The bolts 45 extend through the cap 39, head 30, ring 43 and swivel ring 42. The nuts on the bolts clamp all these elements on the collar 41. By loosening the bolts 45 slightly the head 30 can be turned to any position wanted. By such means the blades can be used to cut horizontally or vertically whenever required.

When the trimmer is used for cutting vertically, as in trimming along side walks or other places, the blades are turned to vertical position and the blades 23 locked stationary. In order that grass or other material may be raised up high enough for the blades 24 to cut the grass without striking the ground, a shield or hook 46 may be attached to the blade 23 which is next to the ground. The hook or shield 46 has a cut-out therein for one of the blades 23 and may be secured to the blade 23 by a bolt 47, the blades 23 and the hook 46 having holes for bolts. The hook or shield 46 will run under the grass and lift it high enough to be cut by the blades 24.

If an additional support is wanted for the frame, an arm 48 may be attached to the frame by the bolt 10 and nut 13. This arm 48 may be attached to either side of the trimmer. The arm 48 is provided with a roller 49. The roller 49 would serve a useful purpose for drawing the trimmer back at each stroke, since the weight of the trimmer can be thrown on the arm 48 on the backward movement. The arm 48 and roller 49 constitute a wheeled brace.

For use in trimming hedges or cutting shrubbery at considerable heights above the ground, a substitute handle 50 can be attached to the trimmer and provided with a shoulder rest 51. The device may be pressed against the shoulder and held up for operation. A crank 52 is provided for operating the blades.

What I claim, is:—

1. A lawn trimmer having a frame composed of a handle and a bearing member, angular adjustments for said member and handle, a shaft rigidly connected to said handle and to said bearing member, a traction wheel revolubly mounted on said shaft, said shaft forming the connection between said handle and said bearing member, associated blades carried by said bearing member, and driving means for said blades operatively connected with said blades and with said wheel and driven by said wheel.

2. A lawn trimmer having a supporting and driving wheel, a frame composed of a handle and a bearing member, angular adjustments for said member and handle, a shaft for said wheel forming the connection between said handle and said bearing member, associated rotary blades carried by said bearing member, and driving means for said blades operatively connected to said blades and to said wheel.

3. A lawn trimmer having a supporting and driving wheel, a frame composed of a handle, a bearing member provided with a rack thereon, a shaft for said wheel forming the connection between said handle and bearing member, and having a rack engaging the rack on said bearing member, associated rotary blades carried by said bearing member, and driving means for said blades operatively connected to said blades and to said wheel.

4. A lawn trimmer having a supporting and driving wheel, a handle therefor, a bearing member in front of said handle, a shaft for said wheel connecting said handle and said bearing member rigidly together, a rack adjustment for said handle and bearing member, associated rotary blades, and driving means for said blades operatively connected to said blades and to said wheel and carried by said bearing member.

5. A lawn trimmer having a supporting and driving wheel, a bearing member provided with a circular rack, a handle co-operating with said wheel and bearing member, a pair of strap bars for said handle, a shaft for said wheel non-rotatably connected at one end to one of said strap bars and having on the other end a circular rack for engaging said first named circular rack, a bolt for clamping said strap bars on said shaft and bearing member, rotary cutters, and driving means for said cutters operatively connected to said cutters and to said wheel.

6. A lawn trimmer having a supporting and driving wheel, a frame composed of a handle and a bearing member and a wheeled brace co-operating with said frame, a shaft for said wheel forming the connection between said handle and said bearing member and making the handle and shaft and bearing member rigid with each other, rotary blades carried by said bearing member, and driving means for said blades operatively connected to the blades and to said wheel.

7. A lawn trimmer having a supporting and driving wheel provided with face cogs, a bearing member and a handle supported by said wheel, adjustably connected together, a shaft for said wheel constituting the connection for said handle and bearing member, a shaft journaled in said bearing member and a pinion rigid therewith and meshing with said face cogs and driven thereby, rotary cutters, and driving means for said cutters operatively connected with said cutters and with said shaft and driven by said shaft.

8. A lawn trimmer having a supporting and driving wheel provided with face cogs, a bearing member and a handle supported by said wheel and adjustably connected together, a shaft for said wheel constituting the connection for said handle and bearing member, a shaft journaled in said bearing member and a pinion rigid therewith and meshing with said face cogs and driven thereby, means on said bearing member for holding said pinion in mesh with said cogs, rotary cutters, and driving means for said cutters operatively connected to said cutters and to said shaft and driven by said shaft.

9. A lawn trimmer having a supporting and driving wheel provided with face cogs, a bearing member and a handle supported by said wheel and adjustably connected together, a shaft for said wheel constituting the connection for said handle and bearing member, a shaft journaled in said bearing member and a pinion rigid therewith and meshing with said cogs and driven thereby, a head supported by said bearing member, rotary cutters, and gearing carried by said head and operatively connected to said cutters and to said shaft and driven by said shaft.

10. A lawn trimmer having a supporting and driving wheel, a bearing member and a handle supported by said wheel and adjustably connected together, a shaft for said wheel constituting the connection for said handle and bearing member, a head supported by said bearing member, rotary cutters, and driving means carried by said bearing member and said head and operatively connected to said cutters and to said wheel and driven by said wheel.

11. A lawn trimmer having a supporting and driving wheel, a bearing member supported by said wheel, a head supported by said bearing member and having a swivel connection therewith, rotary cutters, and driving means carried by said bearing member and head and operatively connected to said cutters and to said wheel and driven by said wheel.

12. A lawn trimmer having a supporting and driving wheel, a bearing member supported by said wheel, a head supported on said bearing member and having a swivel connection therewith, rotary cutters, driving means for said cutters carried by said bearing member and head and operatively connected to said cutters and to said driving wheel and driven by said driving wheel, and means for binding said head on said bearing member at different points of adjustment for setting said cutters in different cutting positions.

13. A lawn trimmer having a supporting and driving wheel, a bearing member supported by said wheel and adjustably connected together, a handle and a shaft for said wheel forming the connection for said bearing member and handle, a head supported on said bearing member, a pair of rotary cutters, and driving means carried by said head and bearing member for rotating said cutters in opposite directions, operatively connected to said cutters and to said wheel and driven by said wheel.

14. A lawn trimmer having a supporting and driving wheel, a bearing member supported by said wheel, a handle and a shaft for said wheel forming the connection for said bearing member and handle, a head supported on said bearing member, a pair of rotary cutters, driving means carried by said head and said bearing member adapted to drive said cutters in opposite directions operatively connected to said wheel, and means in said head for locking one of said cutters against rotation.

15. A lawn trimmer having a supporting and driving wheel, a bearing member supported on said wheel, a head adjustably supported on said bearing member, a shaft journaled in said bearing member and operatively connected to said wheel at one end and provided with a bevel gear wheel at the other end, upper and lower associated rotary cutters, an outer shaft carrying said upper cutters journaled in said head provided with a gear wheel driven by said bevel gear, and an inner shaft journaled in said outer shaft and in said head and carrying said lower cutters and provided with a gear wheel driven by said bevel gear wheel.

16. A lawn trimmer having a supporting and driving wheel, a bearing member supported by said wheel, a head supported by said bearing member, a pair of rotary cutters, driving means carried by said head and said bearing member adapted to drive said blades in opposite directions operatively connected to said wheel, means in said head adapted to lock one set of said cutters against rotation, and a shield adapted for attachment to one blade of the cutters when locked stationary for protecting the revolving cutters and lifting material into the path of the revolving cutters.

In testimony whereof, I set my hand, this 26th day of March, 1921.

JOSEPH WADE CROWDER.